(12) United States Patent
Cauley et al.

(10) Patent No.: US 11,822,460 B2
(45) Date of Patent: *Nov. 21, 2023

(54) DYNAMIC INTEGRATION TESTING

(71) Applicant: CERNER INNOVATION, INC., Kansas City, KS (US)

(72) Inventors: Thomas Cauley, Phoenixville, PA (US); Nicholas J Todd, Phoenixville, PA (US)

(73) Assignee: Cerner Innovation, Inc., Kansas City, MO (US)

( * ) Notice: Subject to any disclaimer, the term of this patent is extended or adjusted under 35 U.S.C. 154(b) by 482 days.

This patent is subject to a terminal disclaimer.

(21) Appl. No.: 17/183,059

(22) Filed: Feb. 23, 2021

(65) Prior Publication Data

US 2021/0173762 A1 Jun. 10, 2021

Related U.S. Application Data

(63) Continuation of application No. 16/220,386, filed on Dec. 14, 2018, now Pat. No. 10,936,471.

(51) Int. Cl.
| | |
|---|---|
| *G06F 9/44* | (2018.01) |
| *G06F 11/36* | (2006.01) |
| *G06F 8/60* | (2018.01) |
| *G06F 11/00* | (2006.01) |
| *G06F 8/71* | (2018.01) |

(52) U.S. Cl.
CPC .......... *G06F 11/3664* (2013.01); *G06F 8/60* (2013.01); *G06F 8/71* (2013.01); *G06F 11/008* (2013.01); *G06F 11/368* (2013.01); *G06F 11/3676* (2013.01); *G06F 11/3688* (2013.01)

(58) Field of Classification Search
CPC .............. G06F 11/3664; G06F 11/008; G06F 11/3676; G06F 11/368; G06F 11/3688; G06F 8/60; G06F 8/71
See application file for complete search history.

(56) References Cited

U.S. PATENT DOCUMENTS

| | | |
|---|---|---|
| 8,276,123 B1 | 9/2012 | Deng et al. |
| 9,721,315 B2 | 8/2017 | Christen |
| 2007/0083421 A1 | 4/2007 | Mcnair et al. |
| 2015/0370685 A1* | 12/2015 | Heymann ............ G06F 11/368 714/38.1 |
| 2016/0055079 A1* | 2/2016 | Hanna ................. G06F 11/3684 717/135 |

(Continued)

*Primary Examiner* — Hang Pan
*Assistant Examiner* — Lenin Paulino
(74) *Attorney, Agent, or Firm* — Invoke

(57) ABSTRACT

Computerized systems and methods are provided to intelligently and dynamically generate at least a first set of tests to be executed on one or more changes made to one or more applications to determine whether the one or more changes were successful. Data is received regarding one or more changes and a failure probability value for each change is determined. A first plurality of fields are generated for completion by a first user. Upon receiving responses for the first plurality of fields, a first customized code is generated and based upon first customized code, a first set of tests to be executed on the second version of the first application is generated. Additionally, the first set of tests are assigned labels, stored for future use, and executed on the second version of the first application.

20 Claims, 9 Drawing Sheets

(56) References Cited

U.S. PATENT DOCUMENTS

| | | |
|---|---|---|
| 2018/0189450 A1 | 7/2018 | Anthony et al. |
| 2020/0097387 A1 | 3/2020 | Loyola et al. |
| 2020/0192787 A1 | 6/2020 | Cauley et al. |
| 2023/0205684 A1* | 6/2023 | Konrardy .......... G06F 16/90335 703/22 |

* cited by examiner

Probability 400

| | Size of file | % of change | Dependencies | History of failures | Prob Score |
|---|---|---|---|---|---|
| Login | 10 | 5% | Low | None | |
| Register Patient | 50 | 10% | High | None | |
| Add Charges | 100 | 1% | Med | Medium | |
| View Charges | 50 | 30% | Med | Low | |
| Edit Charges | 100 | 10% | High | Medium | |
| Check Patient Out | 20 | 100% | Low | None | |

FIG. 4

Probability Scored 500

| | Size of file | % of change | Dependencies | History of failures | Prob Score |
|---|---|---|---|---|---|
| Login | 1 | 2 | 1 | 1 | 4 |
| Register Patient | 3 | 3 | 5 | 1 | 12 |
| Add Charges | 5 | 1 | 3 | 3 | 12 |
| View Charges | 3 | 3 | 3 | 2 | 11 |
| Edit Charges | 5 | 2 | 5 | 3 | 15 |
| Check Patient Out | 2 | 5 | 1 | 1 | 9 |

FIG. 5

Impact 600

| | Daily Hits (602) | Traced Hazards (604) | Impact Score (606) |
|---|---|---|---|
| 412 — Login | 10000 | 0 | |
| 414 — Register Patient | 500 | 1 | |
| 416 — Add Charges | 1000 | 10 | |
| 418 — View Charges | 200 | 2 | |
| 420 — Edit Charges | 30 | 10 | |
| 422 — Check Patient Out | 500 | 0 | |

FIG. 6

Impact Scored 700

| | Daily Hits (602) | Traced Hazards (604) | Impact Score (606) |
|---|---|---|---|
| 412 — Login | 5 | 1 | 6 |
| 414 — Register Patient | 4 | 2 | 6 |
| 416 — Add Charges | 5 | 4 | 9 |
| 418 — View Charges | 3 | 2 | 5 |
| 420 — Edit Charges | 1 | 4 | 5 |
| 422 — Check Patient Out | 4 | 1 | 5 |

FIG. 7

Change Risks

| | Probability Score (410) | Impact Score (606) | Failure Probability Value (802) |
|---|---|---|---|
| Login (412) | 4 | 5 | 20 |
| Register Patient (414) | 12 | 6 | 72 |
| Add Charges (416) | 12 | 9 | 108 |
| View Charges (418) | 11 | 5 | 55 |
| Edit Charges (420) | 15 | 5 | 75 |
| Check Patient Out (422) | 9 | 5 | 45 |

FIG. 8

Test Mitigation

| | Test 1 | Test 2 | Test 3 | Test 4 | Test 5 |
|---|---|---|---|---|---|
| Login (412) | 3 | 3 | 3 | 3 | 3 |
| Register Patient (414) | 10 | 40 | 10 | 10 | 10 |
| Add Charges (416) | 10 | | 10 | 50 | 50 |
| View Charges (418) | | | 10 | | 50 |
| Edit Charges (420) | 50 | | | | |
| Check Patient Out (422) | 10 | 40 | 10 | 10 | 10 |

DYNAMIC INTEGRATION TESTING

CLAIM OF PRIORITY

This application entitled "Dynamic Integration Testing" is a Continuation Application of U.S. Non-Provisional patent application Ser. No. 16/220,386, filed on Dec. 14, 2018, and entitled "Dynamic Integration Testing," the entirety of which is incorporated herein by reference.

BACKGROUND

Historically, when requirements are generated and code is built for applications in healthcare management systems, such as those used by hospitals to manage patient healthcare from triage to discharge, limited testing is conducted on the code built to due time and monetary constraints. As such, generally, when new or revised code is generated, a limited set of tests are executed on the new or revised code to determine if defects exist. If the new or revised code passes the limited set of tests, the new or revised code may be deployed to various environments, including into live use. Unsurprisingly, the limited testing leads to failure to catch defects prior to an application going live or early on in the build process. Correcting identified defects later in the build process or once an application is live results in a lack of efficiency and costs significantly more. For example, if a modification is made to an application related to how treatment charges are added to a patient file and the application is deployed containing errors, it may result in delays in payment or refusal of payment to the health care provider or facility. As such, the cost to fix the defects in the application after the build process has been completed costs significantly more than if the defect was identified immediately after the modification was made to the application or within a short period of time while the application was still in the build process. If such defects occur across several patient profiles, it may have detrimental effects on the profitability of a healthcare facility and the healthcare facilities ability to continue providing care to patients.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Often times, in an effort to deploy new or updated applications for a management system, such as a healthcare financial management system (e.g. billing system) utilized by a healthcare system (e.g. hospital, set of clinics, urgent care, etc.), new or updated applications are deployed as quickly as possible and without adequate testing for potential defects. At times, the limited testing prior to going live or deploying an application may be directed to testing the whole application, rather than the portion that is new or updated. This may lead to missing identifying defects that might not be caught until much later in the build process or once the application is in use. As such, a system which dynamically tests each modification or new portion of an application based on a determined risk or failure probability value early on in the build process will lead to the development of more successful applications, decreased costs, and increased efficiency. Further, a system which can dynamically identify the changes made to an application and target tests directed to those changes, will be more effective in identifying defects in the application code at an early stage, as tests directed to the whole application may overlook defects formed from changes made to the application based on requirements received by a system.

Embodiments of the present invention generally relate to computerized systems and methods that facilitate continuous dynamic testing of one or more changes made to one or more applications. This allows early identification of issues and resolution prior to applications going live, thereby reducing future problems and costs. The system is configured to receive one or more requirements to generate one or more changes to a first version of a first application. The system then generates a second version of the first application based on the one or more requirements received. Following this, the system determines a failure probability value for each of the one or more changes and identifies a first set of tests to be run on the second version of the first application based on the failure probability value for each of the changes made. The first set of tests is limited in number and time and are therefore targeted to the changes with the highest failure probability value determinations. Accordingly, a first set of tests are executed on the second version of the first application. If the second version of the first application passes the first set of tests, the second version of the first application is deployed to a first environment where a second set of tests identified are executed. Then, if the second version of the first application passes the second set of tests, the second version of the first application is deployed or promoted to a next environment, which may include further testing or may result in the application deploying into use. If the second version of the first application fails the first set of tests executed, the second version of the first application is returned to the build stage and regenerated with one or more modifications to the one or more changes based on failure results from the first set of tests.

BRIEF DESCRIPTION OF THE SEVERAL VIEWS OF THE DRAWINGS

The present invention is described in detail below with reference to the attached drawing figures, wherein:

FIG. 4 an exemplary probability chart comprising information regarding modifications made to an exemplary application;

FIG. 5 is the exemplary probability chart of FIG. 4 comprising a determined probability score for the exemplary modifications shown;

FIG. 6 is an exemplary impact chart comprising information regarding the same exemplary modifications of FIG. 3;

FIG. 7 is the exemplary impact chart of FIG. 6 comprising a determined impact score for the exemplary modifications;

FIG. 8 is an exemplary change risks chart comprising information regarding the same exemplary modifications of FIG. 3 and a determined failure probability value;

FIG. 9 is an exemplary test migration chart comprising the exemplary modifications of FIG. 3;

FIG. 12 illustrates exemplary test code generated by the test generator of FIG. 11.

DETAILED DESCRIPTION

Figure 1:
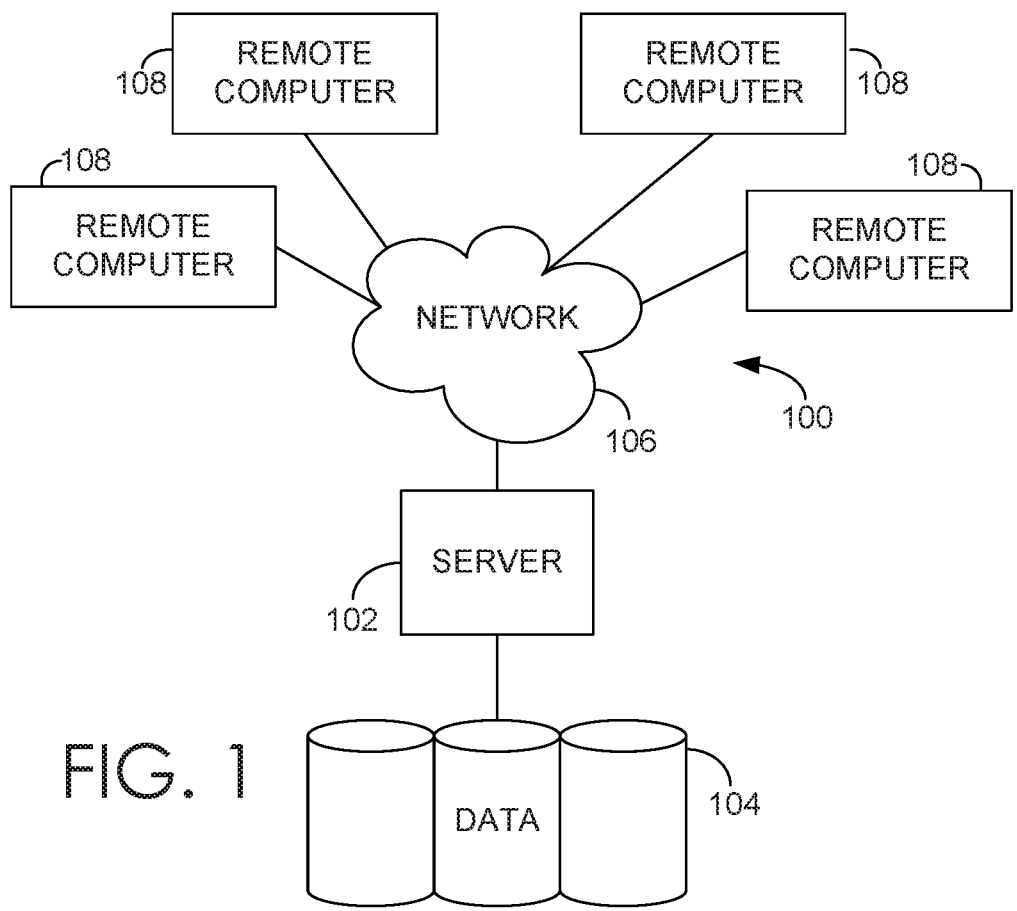
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As one can imagine, in large healthcare systems, changes to software and applications are made continuously to adapt to the changing needs of healthcare providers, patients, administration, and regulations. Traditionally, when modifications are made to existing software or applications, the modifications underwent a limited number of tests during a limited period of time. As can be appreciated, efficiency and timeliness is critical for healthcare systems, both when dealing with patient care and when handling more administrative tasks such as billing clients for treatment provided. Therefore, when only a limited set of tests were run due to time constraints and other demands, applications were deployed and put into use that may have comprised defects that were not discovered until the application were in use. Once defects are identified at this stage, it is costly to return to the build stage to cure the defects in an application. Therefore, considering these challenges in a constantly changing environment, a system which tests the specific modifications made to an application immediately after those modifications are made, will allow the system to capture defects sooner and as a result, cure the defects prior to deploying the application, thereby resulting in cost savings and a better functioning system.

Further, currently, there is not strong traceability regarding the tests executed between the code that filled the requirement and the written requirement itself. For example, the written requirement received by a system may state that in order to change charges on a patient file, there must be review and approval by a second user. In response, the system may generate a second version of the application related to editing patient charges so that the code includes language that will prompt review and approval by a second user prior to finalizing changes to charges on a patient file. Currently, once the edit charges application is changed, there would be very limited testing and the testing completed on the application may be directed to the application as a whole. As such, the test run would check to see if the application was functioning, not whether the code that was modified accurately prompts the edit charges application to ask for review and approval by a second user before accepting charge changes. Therefore, experience has shown, that these tests, which may be referenced as "system tests" may miss defects in the code that was modified if the application as a whole is still functioning properly. The systems and methods described herein resolve this issue, as the tests are written and directed to the specific changes made to the code within the application to meet the requirements received. In other words, the tests are targeted to test the specific part of the application which has been modified. In the current example, the tests identified and executed on the application would be directed specifically to the lines of code that were changed in order to add the limitation to the edit charges application of additional review and approval by a second user. This dynamic testing of the one or more changes early in the build process will lead to more efficiency, cost savings, and more successful applications.

Additionally, by focusing the testing on the specific changes made, rather than simply testing the whole application, it will be easier to determine where defects are occurring. If the tests are dynamically targeted to the changes to the application, the system will pinpoint new defects quickly and be able to resolve them before the application is deployed to the next environment, whether that is a testing or live environment. The order of the tests to be run on an application is based on a determined failure probability value. Utilizing the failure probability value for each of the changes made to one or more applications allows the system to determine the risk of each change made based on a variety of factors including, but not limited to, the size of the file, the percentage of the file changed or amount of code change, history of failures, and the like. Once the failure probability value for each of the changes is determined, the tests to be run can be prioritized based on the probability values determined.

Beginning with FIG. 1, an exemplary computing environment suitable for use in implementing embodiments of the present invention is shown. FIG. 1 is an exemplary computing environment (e.g., health-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein. It will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in the implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though devices and components are represented in FIG. 1 as singular devices and components, it will be appreciated that some embodiments may include a plurality of the devices and components such that FIG. 1 should not be considered as limiting the number of a device or component.

The present technology might be operational with numerous other special-purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be operational and/or implemented across computing system environments such as a distributed or wireless "cloud" system. Cloud-based computing systems include a model of networked enterprise storage where data is stored in virtualized storage pools. The cloud-based networked enterprise storage may be public, private, or hosted by a third party, in embodiments. In some embodiments, computer programs or software (e.g., applications) are stored in the cloud and executed in the cloud. Generally, computing devices may access the cloud over a wireless network and any information stored in the cloud or computer programs run from the cloud. Accordingly, a cloud-based computing system may be distributed across multiple physical locations.

The present technology might be described in the context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of non-transitory computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Computer-readable media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations including operating systems, device drivers and the like. The remote computers might also be physically located in traditional and nontraditional clinical environments so that the entire medical community might be capable of integration on the network. The remote computers might be personal computers, servers, routers, network PCs, peer devices, other common network nodes, or the like and might comprise some or all of the elements described above in relation to the control server. The devices can be personal digital assistants or other like devices. Further, remote computers may be located in a variety of locations including in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Healthcare providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional clinical environments so that the entire medical community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information might also be sent directly from a remote medical device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
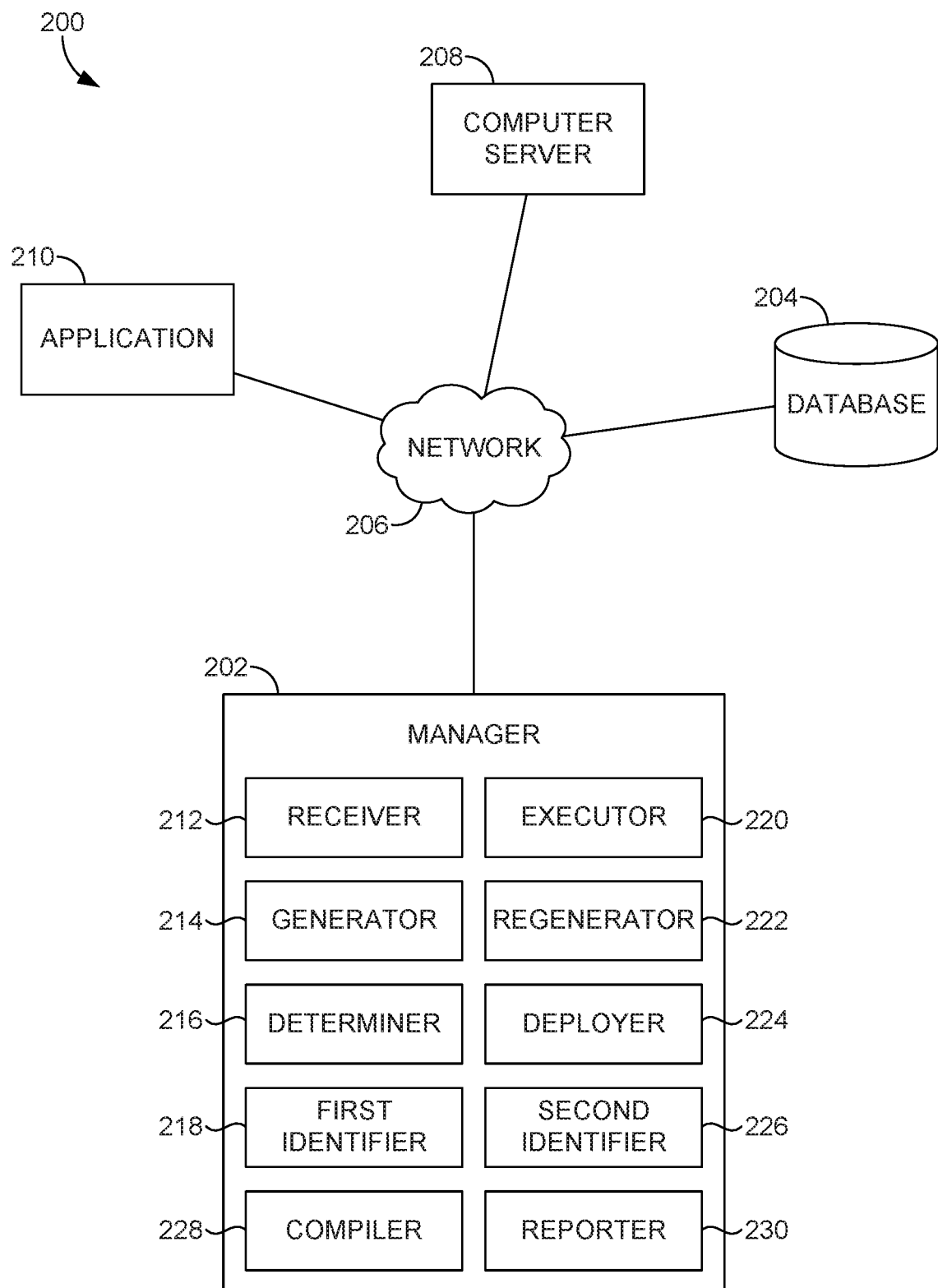
FIG. 2 is an exemplary system architecture suitable to implement embodiments of the present invention.

Turning now to FIG. 2, an exemplary system 200 for dynamically testing one or more changes made to one or more applications is depicted. The exemplary system 200 is merely an example of one suitable system and is not intended to suggest any limitation as to the scope of use or functionality of embodiments of the present invention. Neither should the system 200 be interpreted as having any dependency or requirement related to any single component or combination of components illustrated herein.

The exemplary system 200 comprises at least one computer server 208, at least one application 210, a manager 202, a database 204, and a network 206. While FIG. 2 illustrates only one computer server 208, it is contemplated that the system 200 may comprise any number of computer servers 208. Additionally, the application 210 may be located on any user device. Further, FIG. 2 illustrates only one database 204, but it is contemplated that the system 200 may comprise more than one database 204 depending on the needs of the system 200.

The database 204 may be located remotely or on the cloud. Additionally, the database 204 is the location at which the code for an application is stored. As will be discussed in more detail, a receiver 212 will receive requirements for generating one or more changes to a first version of a first application. Upon receiving the requirements, the system 200 will generate a second version of the first application via a generator 214. The requirements for the changes to be made are written requirements which provide instructions for the changes needed. For example, a written requirement received may state that a first application code should be written so that at each patient registration, the patient is to create a numeral passcode for future use when verifying personal information for additional security. This new requirement may be necessary due to changing security and privacy laws and as such, the healthcare system may be bound to incorporate such additions to be in compliance. When this requirement is received, the system 200 may change the code in a first application such that the application will automatically prompt an individual managing the registration of a patient to have the patient create a numeral passcode during the registration process for future use. The changes made by the system 200 to generate the second version of the first application may include adding code, deleting code, or modifying existing code to meet the requirements received. After the changes are made to the first application, the system 200 generates a second version of the first application that comprises one or more changes based on the one or more requirements received. In this case, the system 200, via a generator 214, would generate a second version of the first application (e.g. second version of the code of the first application) related to the patient registration which would now include the creation of a numeral passcode during registration. Once the changes are made to generate the second version of the first application, the second version of the first application is stored in the database 204.

As depicted, the system 200 is comprised of a manager 202, but it is contemplated the system 200 may include more than one manager 202. It will be appreciated that some or all of the subcomponents of the manager 202 may be accessed via the network 206 and may reside on one or more devices. Additionally, the manager 202 may also be integrated into the application 210. Further, in some embodiments, one or more of the illustrated components may be implemented as a stand-alone application. The components described are exemplary in nature and in number and should not be construed as limiting. Any number of components may be employed to achieve the desired functionality within the scope of the embodiments hereof.

Generally, the manager 202 is configured to dynamically manage the testing of one or more changes made to one or more applications. In embodiments, the manager 202 may be configured to access the at least one computer server 208 at any time based on receiving one or more requirements to generate one or more changes to a first version of a first application. As shown, the manager 202 is comprised of several components including: a receiver 212, a generator 214, a determiner 216, a first identifier 218, an executor 220, a regenerator 222, a deployer 224, a second identifier 226, a compiler 228, and a reporter 230. In other embodiments, the manager 202 may include any number of components necessary for the dynamic testing of one or more changes to one or more applications.

The receiver 212 within the manager 202 is configured to receive one or more requirements to generate one or more changes to a first version of a first application. The requirements received by the receiver 212 are written requirements that instruct the receiver 212 on specific changes to be made to the application 210. The receiver 212 may receive such requirements from health care providers, administrators, billing personnel, technology personnel or various other authorized individuals within a healthcare system. For example, the receiver 212 may receive instructions from an individual who works in the technology department of a hospital. The individual may have received instructions from financial or billing personnel indicating that a change is needed to an application regarding how charges are added regarding treatment provided. As such, the financial or billing personnel relays the substantive change needed to the application 210 to the technology personnel, who then translates the substance of the change into a written requirement received by the receiver 212. In another example, the system 200's receiver 212 may receive written requirements requiring changes to the code of a first application regarding patient registration to continue to improve and make that process more efficient.

While the requirements received are described as being indirectly received from individuals via written requirements sent to the receiver 212 via methods such as coding, it is contemplated that the system 200 may also intelligently determine changes needed to applications based on a variety of factors and then automatically create and send the receiver 212 written requirements for one or more changes needed. For example, the system 200 may identify a defect or area in an application which is not functioning efficiently and may create the written requirement to fix the issue and send the written requirement to the receiver 212. As such, it is contemplated that the creation and transmission of the written requirement to the receiver 212 may be completely automated or partially automated and may or may not require manual input from individuals.

After the receiver 212 receives the requirements for generating one or more changes to a first version of a first application 210, the generator 214 generates a second version of the first application comprising the one or more changes. The second version of the first application may comprise additional code, less code, or modifications to the first version of the first application's code. The types of modifications made to the first version of the first application will depend on the type and extent of the written requirements received by the receiver 212.

In some embodiments, after the second version of the first application is generated by the generator 214, the second version of the first application may be stored in the database 204 until testing is completed. As such, a compiler 228 may compile the changes made to the first version of the first application prior to the identification of the first of tests.

A determiner 216 determines a failure probability value of the second version of the first application. The failure probability value may be based on a variety of factors, including how big the file is, the percent of the file that was changed (e.g. how many lines of code were added and/or changed) to meet the requirements, and history of failures. These factors are analyzed and a failure probability value for each of the one or more changes (e.g. a probability value for the second version of the application failing due to the one or more changes made) is determined by the determiner 216. While the determiner 216 described herein may determine failure probability values for each change made to the first application, in other embodiments, the determiner 216 may also be configured to determine an overall failure probability value for the application as a whole. Additionally, the failure probability value determined for each change may be a numerical value or percentage or some other measurement of failure probability so long as the determination accurately represents the likelihood or risk that the application may fail or comprise defects due to the changes made to generate the second version of the first application.

A first identifier 218 identifies a first set of tests to be run on the second version of the first application based on the failure probability value for each of the one or more changes in the second version. In general, there several potential tests that can be run on an application prior to deployment to determine if the application will fail. Some tests may be directed to the application as a whole, while other tests may be directed to a specific component of the application. Because of time constraints and the desire to determine as quickly as possible whether the changes made to the first application have defects, the time to run the first set of tests is limited. As such, not all tests can be run on the second version of the first application at this time. Therefore, using the failure probability value for each change determined, the first identifier 218 identifies a predetermined number of tests to be included in the first set of tests. The first identifier 218 prioritizes the tests to be included in the first set of tests based on the failure probability values of each of the changes, the time allotted to run the first set of tests, and a predetermined number of tests to be included in the first set of tests.

Once the first identifier 218 has identified the first set of tests to be executed on the second version of the first application, an executor 220 will execute the first set of tests on the second version of the first application. In some embodiments, the first set of tests may be known as a "smoke test." The challenge with the first set of tests or smoke test is that the first set of tests are limited in number and there is a limited amount of time to run these tests.

If the second version of the first application passes the first set of tests executed by the executor 220, then the second version of the first application is deployed by a deployer 224 to a first environment for further testing. The first environment may be located in the cloud. At the first environment, a second identifier 226 will further identify a second set of tests to be run on the second version of the first application based on the determined failure probability values for each of the one or more changes. Similar to the manner in which the first identifier 218 identified and the executor 220 executed the first set of tests, the second identifier 226 will identify the tests to be executed by the executor 220 based on the failure probability values. The second identifier 226 will identify the second set of tests, which may comprise all or some of the remaining potential tests to be run on the second version of the first application, and the second set of tests may be directed to the application as a whole or to the specific changes made to the application to meet the requirements received. Once it is determined that the second version of the first application has passed the second set of tests, it may be deployed again by the deployer 224 for service in the healthcare management system or for further testing.

To further explain the test identification process, once the determiner 216 has determined the failure probability values for each change made to the second version of the first application, the first identifier 218 will identify a first set of tests to be executed to test the second version of the first application for defects by identifying the tests available that correspond to the changes made. The first identifier 218 may utilize the database 204 or other sources in the system 200 to identify tests that relate to the changes made. For example, if the failure probability value determined is highest regarding the changes made to the addition of charges portion of the application, the first identifier 218 will identify tests that correspond with testing the types of changes made to the addition of charges portion of the first application. The first identifier 218 will prioritize the available tests based on the failure probability values and identify the tests to be executed in the first set of tests. Once the second application passes the first set of tests, the second identifier 226 would identify the second set of tests to be executed which would begin with the tests that corresponded to the changes with the highest failure probability value after the changes already addressed by the first set of tests executed.

Additionally, after the first set of tests are executed, there may be reporting of the results back to the database 204 by a reporter 230. The reporter 230 reports the details of the results of the first set of tests and/or the second set of tests in order to capture the defects or lack of defects found and the results of the first set of tests executed. Such reporting is useful for future use to avoid repeating defects during build processes.

In the event that the second version of the first application fails the first set of tests executed by the executor 220, the second version of the first application will be regenerated by regenerator 222. Regenerator 222 will take the results of the failed first set of tests and further modify the second version of the first application to cure the defects found. This may include deleting portions of the code, adding portions of code, or further changing the code that was modified in response to receiving the requirements.

Further, once the second version of the first application is regenerated by the regenerator 222, the regenerated second version will once again undergo a first set of tests to determine whether or not the defects have been cured and the application is ready to be deployed to the first environment. In some circumstances, the first set of tests previously identified for the second version of the first application by the first identifier 218 may be repeated. This may occur when the modifications made to the second version of the first application by the regenerator 222 are modifications to the one or more changes made to the first version of the first application to generate the second version of the first application. However, in circumstances where code has been added or deleted, thereby making the changes for the regenerated second version of the first application more significant, it may require the determiner 216 to reevaluate and determine new failure probability values for each of the changes made. Additionally, the first identifier 218 may then need to adjust and identify a new first set of tests based on the updated failure probability values for the changes made to the regenerated second version of the first application.

Figure 3:
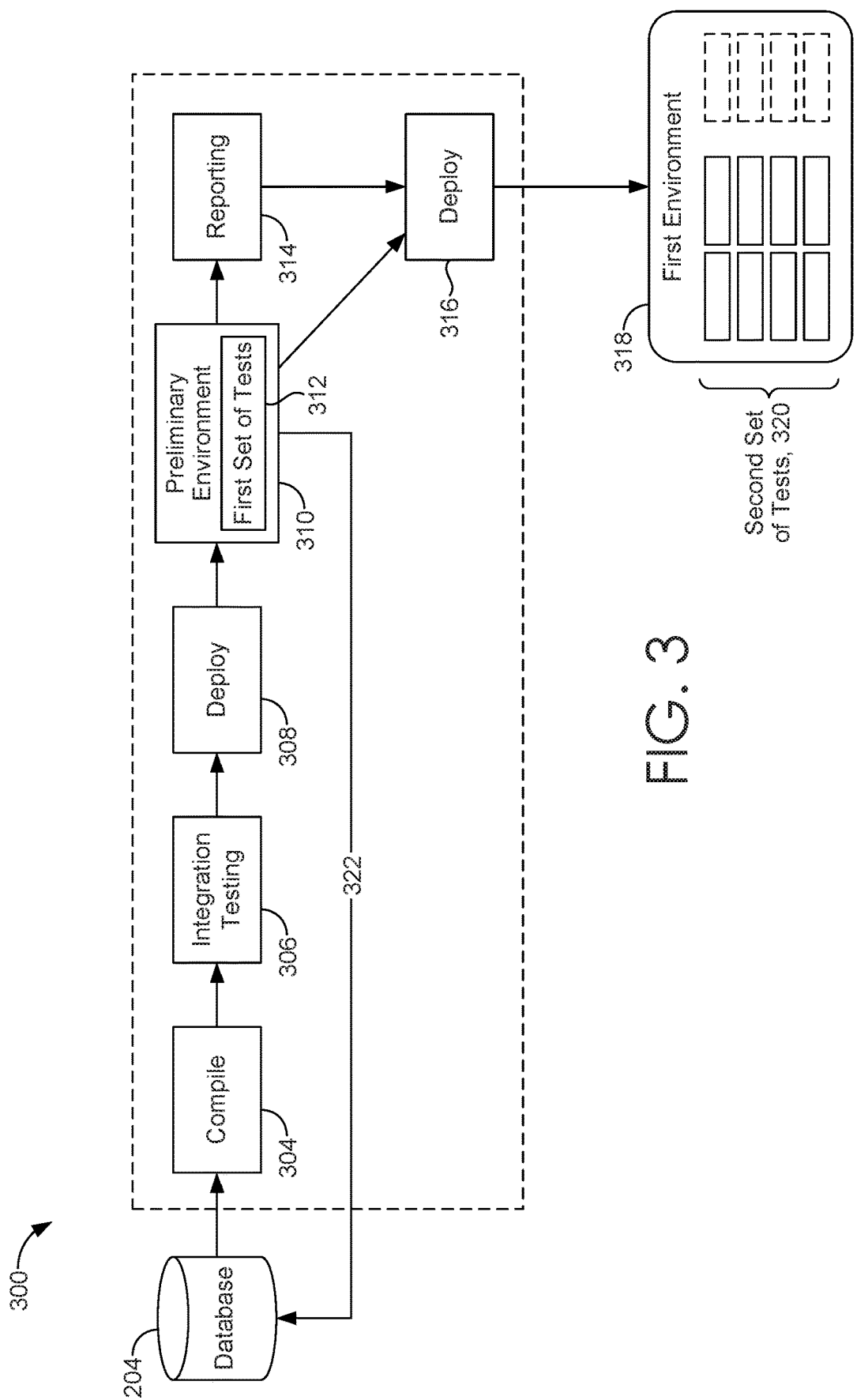
FIG. 3 is an exemplary build process for an exemplary application which includes dynamic testing of one or more changes to one or more applications.

Continuing with FIG. 3, a build pipeline process 300 for dynamically testing one or more changes made to one or more applications is shown. The build pipeline process 300 illustrates how the system 200 described in FIG. 2 works. As described with respect to FIG. 2, the database 204 is where the first application is stored. Once the changes to the first application have been made to generate the second version of the first application, a compiler 228 will gather the application code from the database 204 at step 304 to begin the process of testing the application for potential defects.

After this, the system 200 may perform integration testing at step 306 or unit testing on the application. The integration testing will occur on the whole application itself and is testing the application on its own. As such, integration testing 306 provides for testing the application and whether there are generally defects, but does not look at the individual changes made to generate the second version of the first application. It also does not test the second version of the first application as a part of the larger healthcare management system. Instead, for example, it may only test the patient register application code, but not the individual changes made to the patient register application code or whether the patient register application code functions successfully when implemented into the larger healthcare management system. The types of tests run at the integration testing step 306 are very fast tests that generally take seconds per test and seconds overall to complete. As such, the integration testing step 306 primarily captures whether the application is generally functioning. In other words, the integration testing done at step 306 tests the absolute basic functions of the application and whether those are working. For example, the integration testing at step 306 may test whether the computer server 208 was able to start up or whether a user was able to log in. Further, the integration testing does not change. The same tests are run for each application, regardless of the type of application or changes made by the generator 214 in response to the requirements received. Once the integration testing step 306 is complete, the system 200 may deploy the second version of the first application at step 308, via deployer 224 for further testing in a preliminary environment 310 shown in FIG. 3. Integration testing at step 306 may or may not be a standard part of the dynamic testing process. While the build pipeline process 300 shows integration testing at step 306, the system 200 may not include integration testing on the application if undesired.

Once the first identifier 218 has identified the first set of tests 312 to be executed on the second version of the first application, the executor will execute the first set of tests 312 on the second version of the first application in the preliminary environment 310. As noted, the challenge with the first set of tests or smoke test, is that the first set of tests 312 are limited in number and amount of time to run these tests. This portion of the build pipeline process 300 is very time sensitive as there is significant pressure to build applications quickly and to determine whether the applications are successful as soon as possible. Generally, only about 1% of the tests can be run during the first set of tests 312 while the second version of the first application is in the preliminary environment 310. Additionally, some of the tests that comprise the first set of tests may be more complex tests and as such, take a longer time to run. As such, it is beneficial to dynamically target the tests to be included in the first set of tests 312 so that the changes which have been determined to have the highest failure probability value are tested first, providing the opportunity to catch defects earlier on in the build process. Additionally, by targeting the tests to be executed to the specific changes made to the first application, the tests are designed to find defects, if they exist. Further, the inventory of potential tests that might be executed on applications will grow over time as new tests are constantly developed to address different changes in code, providing a multitude of test options for the first identifier 218 to utilize when determining the first set of tests to execute. The inventory of potential tests may be stored in the database 204 and retrieved by the first identifier 218 as needed.

If the second version of the first application passes the first set of tests 312 executed, then the second version of the first application is promoted or deployed at step 316 by the deployer 224 to a first environment 318 for further testing. At the first environment 318, as described, the second identifier 226 will identify a second set of tests 320 to be run on the second version of the application based on the determined failure probability values for each of the one or more changes. The second identifier 226 will identify the second set of tests 320, which may comprise all or some of the remaining potential tests to be run on the second version of the first application and the second set of tests 320 may be directed to the application as a whole or to the specific changes made to the first application to meet the requirements received. Similar to the manner in which the system identified and executed the first set of tests 312, the second identifier 226 will identify which tests to run based on the failure probability values. In some circumstances, the second set of tests 320 will begin with the test with the highest failure probability value after the first set of tests 312 are executed. In other words, the potential available tests will have failure probability values assigned by the determiner 216. The first identifier 218 may identify, for example, five tests to execute on the one or more changes which have the five highest failure probability values. Then, the second identifier 226 may identify the second set of tests 320 to execute beginning with the sixth test corresponding to the change with sixth highest failure probability value.

Once it is determined that the second version of the first application has passed the second set of tests 320, it may be deployed for service in the healthcare management system or it may undergo further testing in a subsequent environment. Returning to the example where the requirement received was to incorporate a passcode into the patient registration process, once the second version of the first application has satisfied the second set of tests 320 in the first environment 318, the second version of the first application may go live, meaning that when individuals register, they will now be prompted to create the required passcode. In other embodiments, the changes to patient registration comprising the addition of the passcode may undergo additional testing in additional environments.

Additionally, reporting at step 314 occurs during the build pipeline process 300. The reporting step 314 by, for example, reporter 230, may take place at different times throughout the build pipeline process 300 and may occur once or multiple times throughout the build pipeline process 300. As shown, the reporting may occur after the first set of tests 312 are executed in the preliminary environment 310 or the first set of tests may be deployed at step 316 to the first environment 318 without reporting first. Instead, the reporting might occur once the second version of the first application has passed both the first set of tests 312 and the second set of tests 320 (not shown). Additionally, it is contemplated that the reporting step may take place at one time or at multiple times throughout the build pipeline process 300. Reporting 314 occurs in order to capture the defects or lack of defects identified in the second version of the first application and the results of the first set of tests 312 and/or the second set of tests 320 executed.

If the second version of the first application fails the first set of tests 312 executed, then the system 200 will send the second version of the first application back, shown by arrow 322, to the database 204 to resolve the defects identified. As previously described, the regenerator 222 will regenerate the second version of the first application to cure the defects found through results of the first set of tests 312. When the application is returned for correction, the regenerator 222 may either make further modifications to the one or more changes originally made to the first application to generate the second version of the first application or the regenerator 222 may make new, additional changes to cure the defects.

FIGS. 4-5 illustrate charts comprising information regarding exemplary modifications made to an exemplary application. In FIG. 4, the chart illustrates six potential locations where changes may be made on the user interface of an application. In this example, the locations or pages on the user interface where one or more changes were made to generate the second version of the first application are: login 412, register patient 414, add charges 416, view charges 418, edit charges 420, and check patient out 422. The columns show factors considered in determining the probability score 410 regarding the areas modified including the size of the file 402, percent of change 404 or how much of the file has changed between two points in a file, dependencies 406, history of failures 408, and the probability score 410. The size of file 402 describes how big the page is itself. Percent of change 404 describes how much of the file changed. This can be determined by analyzing the amount of change between the first version of the first application and the second version of the first application. Additionally, dependencies 405 indicate whether the page referenced has a lot of dependencies, such as links to reference libraries and other sources that may impact the page, but do not have visibility to the size of change on the page. The number of dependencies 406 may be counted and rated in terms of their complexity. The history of failures 408 relates to the history of failures of the page and is categorized as none, medium, low, or high.

FIG. 5 illustrates the probability chart 400 of FIG. 4 incorporating in numerical values for each of the factors 402, 404, 406, and 408 and a probability score 410 determination. To determine the probability score 410, an algorithm may be used. For example, each factor in the columns of the chart 500 are ranked on a scale (e.g. 1 to 5). For example, for the register patient 414, the size of file was given a value of 3, indicating that the register patient 414 file was of medium size (ranked 3 on scale of 1 to 5), which corresponds to the 50% size of the register patient 414 file shown in FIG. 4. The percent of change 404, dependencies 406, history of failures 408 are given similar numeral values between 1-5 based on the determinations from FIG. 4. The numeral value can be any range desired by a user.

Once the values are determined for each of the pages where changes have occurred to produce the second version of a first application, the probability score 410 is determined utilizing the present algorithm. For simplicity and exemplary purposes, the algorithm to determine the probability score 410 shown in FIG. 5 may be A (size of file 402) plus B (percent of change 404) plus C (dependencies 406) plus D (history of failures 408) equals probability score 410. Continuing with the register patient 414, the calculated probability score 410 is a 12. As seen in FIG. 5, the probability that the register patient 414, add charges 416, and edit charges 420 are associated with the highest probability scores, making them the locations where failure is the most likely due to the changes made to the first application.

The calculation for the probability score 410 as described provides equal weight to each of the factors in columns 402, 404, 406, and 408. However, it is contemplated that in some circumstances, certain factors may be weighted more or less heavily, thereby altering the calculation of the probability score 410. For example, if over time a pattern is established showing that more dependencies 406 or higher numeral values scored for dependencies 406 in FIG. 5 leads to more failures than the size of file, the weight on dependencies 406 may be adjusted in the calculation. In other words, the calculation to determine the probability score 410 might, for example, change to A+B+2.5C+D=probability score 410 rather than the current calculation of A+B+C+D=probability score 410 in which each factor was weighted equally. While the current algorithm of A+B+C+D is described in determining the probability score 410, this algorithm is merely exemplary and the algorithm used in practice may vary.

Continuing on, FIGS. 6 and 7 illustrate Impact Charts 600 and 700 that include data regarding the same changes as seen in FIGS. 4-5. For each of the changes—login 412, register patient 414, add charges 416, view charges 418, edit charges 420, and check patient out 422, the factors assessed for impact are daily hits 602 and traced hazards 604. These factors are analyzed to determine the impact score 606 which is generated by, for example, the determiner 216 of FIG. 2. However, in some embodiments, the impact score 606 may be determined by a separate, impact score generator, which may be located within the manager 202. Data is gathered for each of the locations of change 412-422 and the determiner 216 generates the impact score 606 based on the daily hits 602 and trace hazards 604. Daily hits 602 are the number of hits the specific page receives for a set time period (generally within a day). For example, the login page 412 is shown as receiving 10,000 hits each day. The trace hazards 604 relate to hazards that may have a direct impact on the application. As shown, login 412 and check patient out 422 have no trace hazards, while add charges 416 and edit charges 420 have trace hazards of 10 in FIG. 6. As such, when the impact is scored in FIG. 7, the add charges 416 and edit charges 420 both have higher numeral values assigned to them (both are assigned a 4).

Similar to how the probability score 410 was calculated in FIG. 5, the daily hits 602 and trace hazards 604 are given a numeral value between 1-5 for each of the changes 412-422 shown in FIG. 7. In FIG. 7, the login 412, register patient 414, add charges 416, view charges 417, edit charges 420 and check patient out 422 are each assigned numeral values for the daily hits 602 and trace hazards 604 based on the numbers from FIG. 6. For example, the daily hits 602 for add charges was 1000 so add charges 416 was given the highest numeral value of 5. Add charges 416 also had a trace hazards number of 10 and as such, was determined to have a trace hazards 604 numeral value of 5.

Once again, the algorithm of the present invention is used to determine the impact score 606. In this example, the algorithm to determine the impact score 606 is similar to the algorithm used to calculated the probability score 410 in FIG. 5. To determine the impact score 618, the determiner 216 will determine the sum of the daily hits 602 and the trace hazards 604. For example, with regard to add changes 416, the impact score generator will add the numeral value of the daily hits (5) with the trace hazards value (4) resulting in the impact score 606 being a 9. As such, in review of the data in FIG. 7, add changes 416 may have the highest potential impact if there are defects in the one or more changes made to generate the second version of the first application. Additionally, while the determiner 216 determines the impact score 606 for each of the pages 412-422, in other embodiments, a separate component, such as an impact score generator that may or may not be located within manager 202 may determine the impact score 606.

Next, FIG. 8 depicts a change risks chart 800 that comprises the probability score 410 determined in FIG. 5 and the impact score 606 determined in FIG. 7 for each of the pages 412-422 that had one or more changes made by the generator 214 for the generation of the second version of the first application. In this embodiment, to calculate failure probability value 802, the determiner 216 multiplies the probability score 410 by the impact score 606. For example, for add charges 416, the probability score 12 is multiplied by the impact score value of 9 resulting the failure probability value of 108. As seen in FIG. 8, the add charges 416 has the highest risk score of 108, followed by edit charges 420 with a failure probability value of 75. While the calculation of the failure probability value 802 is described as the probability score 410 multiplied by the impact score 606, in other embodiments, the probability score 410 and impact score 606 may not carry equal weight. Further, based on the requirements of the system 200, the algorithm may also change to handle more or less complex scenarios.

Next, FIG. 9 illustrates a test mitigation chart 900 comprising data related to the pages that undergo one or more changes in pages 412-422. The purpose of the test mitigation chart 900 is to illustrate whether there are tests, such as tests one through five, which can effectively mitigate the risks. At this point in the process, the failure probability values 802 have been identified and the system 200 has identified the areas to be targeted for testing based on the probability scores 410, impact scores 618, and failure probability value 802. For example, since add charges 416 presented with the highest failure probability value 802 of 108 (seen in FIG. 8), the first identifier 218 will identify which tests are to be run on the add charges 416 to effectively test for defects in an effort to mitigate any potential problems. Each of the tests 1-5 may take different amounts of time to execute. As shown, for add charges 416, test 1 had 10 interactions, test 2 had no interactions, test 3 had 10 interactions, test 4 had 50 interactions, and test 5 had 50 interactions. The system 200, via the first identifier 218, will identify which tests should be included in the first set of tests 312 executed on the second version of the first application to determine if any defects exist. For example, add charges 416 has the highest interactions, with test 4 being the test with the most interactions (50). Therefore, the first identifier 218 may identify test 4 to be run on the add charges 416 as a part of the first set of tests 312. The first identifier 218 is limited in the number of tests that may be included in the first set of tests 312 and the amount of time that the first set of tests 312 have to be executed on the second version of the first application. As such, the first identifier 218 may choose the tests which have the most interactions with the most pages 412-422, especially those pages which have the highest probability score 410, impact score 606, and failure probability value 802.

As such, while test 4 and test 5 show the most interactions with the add changes 416 page, looking back to the change risks chart 800 of FIG. 8, the failure probability value 802 for the view charges 418 page was also significant with a calculated risk score 806 of 55. Therefore, the first identifier 218 may instead determine that the better test to run first is test 5 since it has 50 interactions with both the add charges pages 416 and the view charges page 420, allowing for the testing of two different locations of code change at the same time. This would save both cost and time with respect to the user and computational resources.

Figure 10:
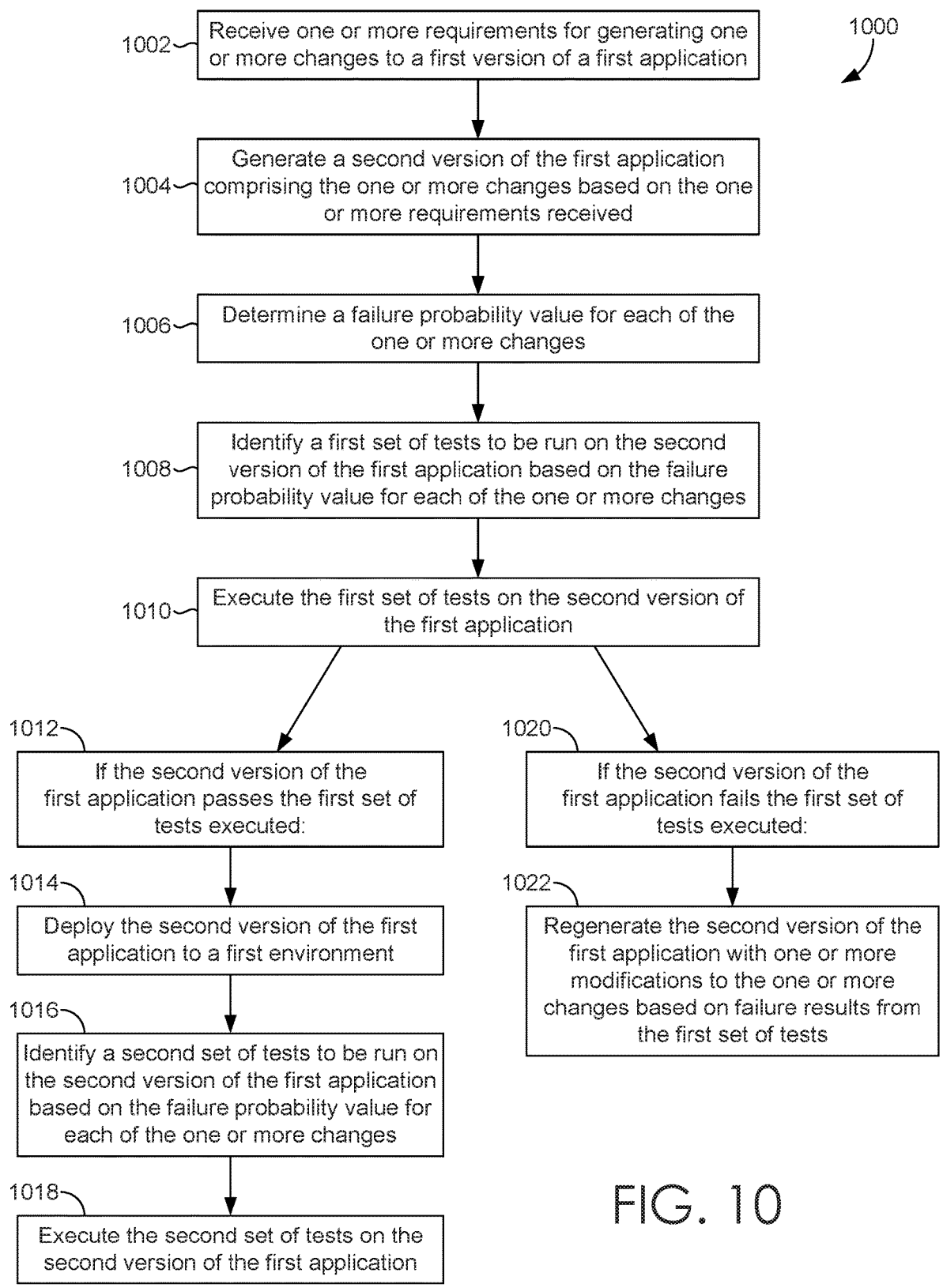
FIG. 10 is a flow diagram showing an exemplary method for dynamically testing one or more changes made to one or more applications.

Next, FIG. 10 illustrates a flow diagram showing an exemplary method 1000 for dynamically testing one or more changes made to one or more applications. The method 1000 may be implemented by the computing system 200 described with respect to FIG. 2. At step 1002 the receiver 212 receives one or more requirements for generating one or more changes to a first version of a first application. As mentioned, healthcare management systems, including those used for financial and billing purposes, are continuously changing with the needs of the healthcare system and due to other requirements. As such, the receiver 212 may receive various requirements for generating one or more changes from multiple sources at step 1002. Once the one or more requirements have been received, the generator 214 generates a second version of the first application comprising one or more changes based on the one or more requirements received by the receiver 212 at step 1004. The determiner 216 determines a failure probability value 802, as described herein, for each of the one or more changes such as the changes to login, or register patient at step 1006. Following the failure probability value 802 determination, the first identifier 218 identifies a first set of tests 312 to be run on the second version of the first application based on the failure probability value 802 for each of the one or more changes made at step 1008. The executor 220 will execute the first set of tests 312 on the second version of the first application at step 1010.

If the second version of the first application passes the first set of tests 312 executed at 1012, then the second version of the first application is deployed by the deployer 224 to a first environment at step 1014. In the first environment, the second identifier 226 identifies a second set of tests 320 to be run on the second version of the first application at step 1016. As described herein, the second set of tests identified by the second identifier 226 are also based on the failure probability value 802 for each of the one or more changes. In some circumstances, the second set of tests 320 may be all the remaining available tests which are executed in order of their failure probability values 802. In other cases, utilizing the failure probability value 802, the second identifier 226 will prioritize the remaining tests and then a predetermined number of tests will be included in the second set of tests 320 based on their failure probability value 802 and potential time constraints. Once the second set of tests 320 are identified, the executor 220 will execute the second set of tests 320 on the second version of the first application at step 1018. While not shown in method 1000, if the second version of the first application passes the second set of tests 320, the second version of the application may be deployed for further testing or may be deployed for live use.

On the other hand, if the second version of the first application fails the first set of tests 312 executed at step 1020, then the second version of the first application will be sent back for regeneration by the regenerator 222 at 1022. The regenerator 222 may add to the file or code of the second version of the first application, delete portions of the file or code of the second version of the first application, and/or modify the file or code at the location of the one or more changes originally made by the generator 214 to generate the second version of the first application, or some combination of these changes. Once the changes are made to cure the defects identified, a regenerated second version of the first application will then restart the method 1000 at either step 1006 or 1008. Depending on the type and extent of the additional changes made by the regenerator 222 to cure the identified defects, the determiner 216 may need to determine new failure probability values 802. Additionally, for the same reasons, the first identifier 218 may need to identify a new first set of tests 312 to be run on the regenerated second version of the first application. Whether the first set of failure probability values 802 determined and the first set of tests 312 determined for the second version of the first application may be used again or whether new failure probability values 802 and sets of tests 312 and 320 may be need to be identified may vary with each change or version of an application.

Dynamic Test Generator

As various applications 210 within the system 200 are modified in response to additional requirements received, the number of potential tests that can be executed to test each change made to applications will increase and be stored in the database 204. However, since the dynamic testing described herein will be continuously changing in order to adapt to the changes being continuously made to applications 210 within the system 200, there is a need to simplify the test generation process so that each test does not need to be manually coded by individuals.

Currently, each test that is identified by the first identifier 218 or second identifier 226 to be executed on the second version of the first application is individually generated. In most cases, this means that each tests is manually coded so that each test is directed to each change made and can determine if defects exist. As one can imagine, the volume of tests to be coded and generated for the system 200 is large and growing, and it is challenging for the manual coding to keep up with the continuously changing system 200. The potential backlog that might be created because each test is manually coded slows down the build process, which results in greater costs and delays in meeting the requirements received. Further, the process of writing code to create specific tests for each change is a technical process that requires individuals with expertise in coding. Therefore, it would be beneficial for all or part of the code for each test to be automatically generated, thereby saving significant time, costs, and resources.

In order to resolve the issue, some embodiments of system 200 may further comprise a dynamic test generator (not shown) within the manager 202. The dynamic test generator may be a tool that automatically and intelligently writes the code and creates the tests needed to test the changes being made to various applications. This would remove the need for individuals to write the code for all the tests needed based on the changes made to the system. The dynamic test generator also simplifies the code writing and test generating process so that it does not require an individual with a technical expertise.

Figure 11:
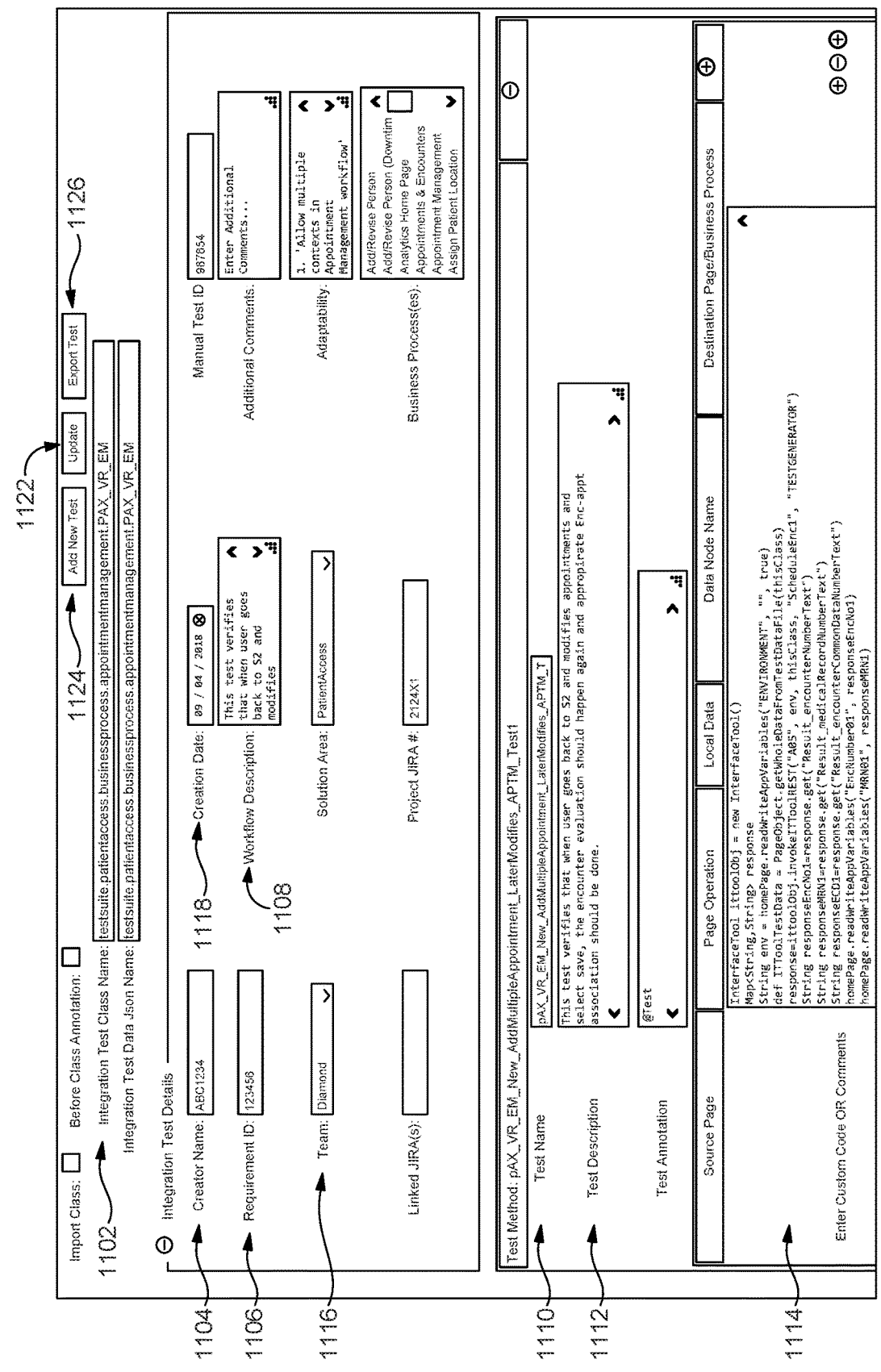
FIG. 11 is an exemplary user interface that illustrates how an exemplary test generator may automatically generate test code.

Turning to FIG. 11, an exemplary user interface 1100 provided by the dynamic test generator is illustrated. As shown, the user interface 1100 comprises several fields of data such as fields 1104 and 1106 that need to be generated so that the code can be created for the desired test. The present user interface 1100 simplifies the coding and test generation process significantly. As shown, an individual may complete certain data fields such as fields 1104 and 1106 by either manually entering information or by making selections from a drop down menu.

To begin, the individual creating the test must enter information such as the Integration test class name 1102, which will describe the test function and target. For example, integration test class name 1102 indicates that the test is directed towards appointment management. Additionally, additional identifying information such as creator name 1104, requirement ID 1106, team name 1116, and creation date 1118 are manually entered. Further, a workflow description 1108 is manually entered and describes the purpose of the test being generated. Also, a test name 1110 is entered naming the present test along with a test description 1112 which explains the test. Here, the test description 1112 indicates that the test is designed to verify that when a user goes back to "S2" and modifies appointments and selects save, the encounter evaluation should happen again and appropriate enc-appt association should be done. The test description 1112 clarifies what the test is testing on the application 210.

Finally, the dynamic test generator will require some custom code or comments 1114 to be entered. Once the individual is finished manually inputting the required data, the individual may press the update 1122 button, triggering the dynamic test generator to create the code for the desired test. Additionally, the individual may add a new test 1124 or export the test created 1126. While FIG. 11 illustrates exemplary data fields that would be required to be manually entered so that the dynamic test generator may create the desired test, it is contemplated that the type and amount of information that must be manually provided may vary, and in some circumstances, the entire test may be automated so that no manual input is needed. Further, as demonstrated by FIG. 11, the amount and type of information that must be entered on the user interface 1100, is limited and would allow for an individual with a non-technical background to input the required data so that the dynamic test generator may generate the full code and thereby create the appropriate test.

While not shown, the user interface 1100 may comprise additional fields which comprise drop down menus to select additional criteria relevant to the coding of the test to be generated by the dynamic test generator. For example, with regard to the appointment management test discussed above, there may be fields to select factors such as admission priority, that allow the individual to build the components of the test without having to actually create the code for the test. In other words, the dynamic test generator allows an individual with a basic level of knowledge regarding the system 200 to build a specific test that is directed to a specific one or more changes made to generate the second version of the first application. Once the fields on the user interface 1100 are completed, the dynamic test generator dynamically generates the appropriate code and creates a test directed to the testing the specific one or more changes for a specific application.

As such, in the prior example where the receiver 212 received requirements to make changes to the register patient 414 page to include the creation of a passcode by the patient, the first identifier 218 or second identifier 226 will identify the relevant tests to execute on the application to determine whether or not the one or more changes to the register patient application were successful and whether any defects exist. In this situation, an individual would manually enter into user interface 1100 the data discussed above, including the test description 1112 that the test to be generated should verify that a passcode is generated and saved for each patient on the patient registration 414 file. Once the necessary data such as the information found at, 1110, 112, and 1114 are entered, the dynamic test generator will generate the code corresponding to the selections chosen, generating a test that is directed to testing whether or not the changes to the register patient 414 are successful. The dynamic test generator will create over the majority of the code and in most cases, will generate about 99% of the code needed to generate the test. Further, while the custom code or comments 1114 section may require some actual coding, the coding needed in this section is fairly limited and may be the type of coding that any individual may be trained to do.

Once the dynamic test generator generates a test to be executed, the test is tagged with relevant labels indicating the test's use and then stored in a folder in the system 200. Once created the tests may be stored in the database 204 such that the first identifier 218 and/or second identifier 226 may identify the appropriate tests from the database so that they can be included in the first set of tests 312 in the preliminary environment 310 and/or the second set of tests in the first environment 318.

Next, FIG. 12 illustrates exemplary code 1200 generated by the dynamic test generator in response to the fields of the user interface 1100 being completed with the required data. As seen, the dynamic test generator generates lines of code that correspond to the testing needed. As shown at lines 1208 and 1204, the code generated by the dynamic test generator is complex and would require coding expertise if done manually. As such, the dynamic test generator allows individuals without coding expertise to create tests to be run on the applications by removing the technical complexity from the process. This will create a more efficient testing system as the number of individuals who can create tests will be increased while costs and resources are decreased, since the dynamic test generator will be automatically creating the code needed for the specific test, which cuts down the time previously spent on manually inputting code. Further, the dynamic test generator will be more effective and have less errors in coding as the dynamic test generator is automated and the window for human error occurs only with the limited fields manually entered on user interface 1100.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more computer readable media having instructions for testing one or more changes made to one or more applications, wherein execution of the instructions by one or more processors causes a plurality of operations, the operations comprising:
   receiving information regarding one or more changes that have been made to a first version of a first application to generate a second version of the first application;
   deploying the second version of the first application to a preliminary environment;
   calculating a failure probability score for each of the one or more changes made to the first version of the first application to generate the second version of the first application;
   calculating an impact score by adding one or more values determined for a plurality of factors;
   determining a failure probability value for each of the one or more changes, wherein the failure probability value is based on multiplying the calculated failure probability score by the calculated impact score;
   based on the failure probability value determination, generating a first plurality of fields to be completed with data to generate a first set of tests for execution on the second version of the first application within a predetermined period of time;
   receiving the data, via a user interface, for each of the first plurality of fields;
   generating a first customized code based on the data received for each of the first plurality of fields;
   based on the first customized code, generating the first set of tests to be executed on the second version of the first application to determine whether the one or more changes made to the first version of the first application to generate the second version of the first application are successful;
   executing the first set of tests on the second version of the first application in the preliminary environment;
   if the second version of the first application passes the first set of tests executed: (a) deploying the second version of the first application to a first testing environment; (b) generating a second set of tests to be executed on the second version of the first application; and (c) executing the second set of tests on the second version of the first application;
   if the second version of the first application fails the first set of tests executed, regenerating the second version of the first application with one or more modifications to the one or more changes based on failure results from the first set of tests;
   and store the first set of tests for future use.

2. The one or more computer readable media of claim 1, wherein the operations further comprise calculating a particular failure probability score by adding one or more values determined for a first plurality of factors.

3. The one or more computer readable media of claim 2, wherein the operations further comprise calculating a particular impact score by adding the one or more values determined for a second plurality of factors.

4. The one or more computer readable media of claim 3, wherein the operations further comprise prioritizing each test within the first set of tests.

5. The one or more computer readable media of claim 4, wherein each test within the first set of tests is prioritized based on the failure probability value for each of the one or more changes made to the first version of the first application to generate the second version of the first application.

6. The one or more computer readable media of claim 1, wherein when the second version of the first application passes the first set of tests executed, the second version of the first application is deployed to a first environment.

7. The one or more computer readable media of claim 6, wherein the operations further comprise executing the second set of tests on the second version of the first application.

8. The one or more computer readable media of claim 7, wherein the operations further comprise prioritizing each test within the second set of tests to be run based on the failure probability values.

9. The one or more computer readable media of claim 8, wherein the operations further comprise executing the second set of tests on the second version of the first application.

10. The one or more computer readable media of claim 1, wherein when the second version of the first application is regenerated, one or more additions are made to the second version of the first application.

11. The one or more computer readable media of claim 1, wherein when the second version of the first application is regenerated, one or more deletions are made to the second version of the first application.

12. The one or more computer readable media of claim 1, wherein the operations further comprise: prior to executing the first set of tests, executing integration testing on the second version of the first application.

13. The one or more computer readable media of claim 12, wherein the integration testing is directed to the second version of the first application as a whole, rather than to the one or more changes made to generate the second version of the first application.

14. A method for testing one or more changes made to one or more applications, the method comprising:
  receiving information regarding one or more changes that have been made to a first version of a first application to generate a second version of the first application;
  deploying the second version of the first application to a preliminary environment;
  calculating a failure probability score for each of the one or more changes made to the first version of the first application to generate the second version of the first application;
  calculating an impact score by adding one or more values determined for a plurality of factors;
  determining a failure probability value for each of the one or more changes, wherein the failure probability value is based on multiplying the calculated failure probability score by the calculated impact score;
  based on the failure probability value determination, generating a first plurality of fields to be completed with data to generate a first set of tests for execution on the second version of the first application within a predetermined period of time;
  receiving the data, via a user interface, for each of the first plurality of fields;
  generating a first customized code based on the data received for each of the first plurality of fields;
  based on the first customized code, generating the first set of tests to be executed on the second version of the first application to determine whether the one or more changes made to the first version of the first application to generate the second version of the first application are successful;
  executing the first set of tests on the second version of the first application in the preliminary environment;
  if the second version of the first application passes the first set of tests executed: (a) deploying the second version of the first application to a first testing environment; (b) generating a second set of tests to be executed on the second version of the first application; and (c) executing the second set of tests on the second version of the first application;
  if the second version of the first application fails the first set of tests executed, regenerating the second version of the first application with one or more modifications to the one or more changes based on failure results from the first set of tests; and
  storing the first set of tests in a database for future use.

15. The method of claim 14, further comprising executing integration testing on the second version of the first application.

16. The method of claim 15, wherein the integration testing is executed on the second version of the first application prior to executing the first set of tests.

17. The method of claim 15, wherein a report is generated comprising results of the execution of the first set of tests.

18. A system for testing one or more changes made to one or more applications, the system comprising one or more processors configured to:
  receive information regarding one or more changes that have been made to a first version of a first application to generate a second version of the first application;
  deploy the second version of the first application to a preliminary environment;
  calculate a failure probability score for each of the one or more changes made to the first version of the first application to generate the second version of the first application;
  calculate an impact score, wherein the impact score is calculated by adding one or more values determined for a plurality of factors;
  determine a failure probability value for each of the one or more changes, wherein the failure probability value is based on multiplying the calculated failure probability score by the calculated impact score;
  based on the failure probability value determination, generate a first plurality of fields to be completed with data to generate a first set of tests for execution on the second version of the first application within a predetermined period of time;
  receive the data, via a user interface, for each of the first plurality of fields;
  generate a first customized code based on the data received for each of the first plurality of fields;
  based on the first customized code, generate the first set of tests to be executed on the second version of the first application to determine whether the one or more changes made to the first version of the first application to generate the second version of the first application are successful;
  execute the first set of tests on the second version of the first application in the preliminary environment;
  if the second version of the first application passes the first set of tests executed: (a) deploy the second version of the first application to a first testing environment; (b) generate a second set of tests to be executed on the second version of the first application; and (c) execute the second set of tests on the second version of the first application;
  if the second version of the first application fails the first set of tests executed, regenerate the second version of the first application with one or more modifications to the one or more changes based on failure results from the first set of tests; and generate a report comprising the results of at least the first set of tests that is stored for future use.

19. The system of claim 18, wherein the system is configured to initiate: if the second version of the first application passes the second set of tests, deploying the second version of the first application for use.

20. The system of claim 18, wherein the system is configured to initiate execution of the first set of tests on the regenerated second version of the first application to determine if defects are resolved in the regenerated second version of the first application.

* * * * *